US 9,202,183 B2

(12) United States Patent
Price et al.

(10) Patent No.: US 9,202,183 B2
(45) Date of Patent: Dec. 1, 2015

(54) AUDITING SYSTEM AND METHOD

(75) Inventors: Kevin I. Price, Walnut Creek, CA (US); John P. Giubileo, Morgan Hill, CA (US); Michael Chad Woolf, Strongsville, OH (US)

(73) Assignee: CA, Inc., New York, NY (US)

( * ) Notice: Subject to any disclaimer, the term of this patent is extended or adjusted under 35 U.S.C. 154(b) by 1884 days.

(21) Appl. No.: 11/423,213

(22) Filed: Jun. 9, 2006
(Under 37 CFR 1.47)

(65) Prior Publication Data
US 2007/0136622 A1   Jun. 14, 2007

Related U.S. Application Data

(63) Continuation of application No. 11/257,345, filed on Oct. 24, 2005, now abandoned, which is a continuation of application No. 11/028,904, filed on Jan. 3, 2005, now abandoned, which is a continuation of application No. 10/804,337, filed on Mar. 19, 2004, now abandoned.

(60) Provisional application No. 60/456,748, filed on Mar. 21, 2003.

(51) Int. Cl.
*G06Q 10/06* (2012.01)
*G06Q 10/10* (2012.01)

(52) U.S. Cl.
CPC ............... *G06Q 10/06* (2013.01); *G06Q 10/10* (2013.01)

(58) Field of Classification Search
CPC ...................... G06Q 10/0631; G06Q 10/0635
USPC ........................... 705/1, 7, 7.12, 7.28
See application file for complete search history.

(56) References Cited

U.S. PATENT DOCUMENTS

| 7,552,480 | B1 * | 6/2009 | Voss ................................ 726/25 |
| 2001/0034847 | A1 * | 10/2001 | Gaul, Jr. ......................... 713/201 |
| 2002/0116639 | A1 * | 8/2002 | Chefalas et al. ............... 713/201 |
| 2002/0174349 | A1 * | 11/2002 | Wolff et al. .................... 713/188 |
| 2003/0126472 | A1 * | 7/2003 | Banzhof ......................... 713/201 |
| 2003/0233438 | A1 * | 12/2003 | Hutchinson et al. ........... 709/223 |
| 2005/0008001 | A1 * | 1/2005 | Williams et al. .............. 370/352 |

OTHER PUBLICATIONS

Vaas, Lisa. "Protegrity Patches Database Security Software." eWeek (Mar. 13, 2003): N/A.*
Price et al., "Auditing System and Method," U.S. Appl. No. 10/804,337, filed Mar. 19, 2004, now abandoned.
Price et al., "Auditing System and Method," U.S. Appl. No. 11/028,904, filed Jan. 3, 2005, now abandoned.
Price et al., "Auditing System and Method," U.S. Appl. No. 11/257,345, filed Oct. 24, 2005, now abandoned.

* cited by examiner

*Primary Examiner* — Susanna M Meinecke Diaz
(74) *Attorney, Agent, or Firm* — Baker Botts L.L.P.

(57) ABSTRACT

A method and system for auditing information technology used to handle financial statement accounts to secure sensitive financial information against the exploitation of vulnerabilities and ineffective configuration standards. By working with the client organization, an audit team evaluates the way the client organization controls sensitive IT systems. The audit team is able to assess the client organization's internal control processed and recommend improvements.

7 Claims, 5 Drawing Sheets

AUDITING SYSTEM AND METHOD

REFERENCE TO RELATED APPLICATIONS

This application is a continuation of U.S. application Ser. No. 11/257,345, filed Oct. 24, 2005 now abandoned and entitled "Auditing System and Method" which is a continuation of U.S. application Ser. No. 11/028,904, filed Jan. 3, 2005 now abandoned and entitled "Auditing System and Method" which is a continuation of U.S. application Ser. No. 10/804,337 filed Mar. 19, 2004 now abandoned and entitled "Auditing System and Method".

The present disclosure is based on and claims the benefit of Provisional Application 60/456,748 filed Mar. 21, 2003, the entire contents of which are herein incorporated by reference.

BACKGROUND

1. Technical Field

The present disclosure relates to auditing. More specifically, to a system and method for auditing information technology.

2. Description of the Related Art

Today's enterprises rely heavily on information technology (IT) to preserve the integrity of sensitive financial information. IT systems generally establish control mechanisms to control access to sensitive data. However, these control mechanisms require proper configuration. When improperly configured, sensitive information managed by the IT systems may be insecure. Configuration standards may be used to ensure that IT systems are properly configured. When configuration standards are appropriate, sensitive data is made safer.

Even when all configuration standards are appropriate, vulnerabilities existing in the software used by IT systems may compromise the security of sensitive financial information. Vulnerabilities may include software defects that allow for the bypass of established controls.

To ensure that enterprises are doing everything possible to detect and resolve ineffective configuration standards and vulnerabilities, enterprises may seek to have their IT audited. Section 404 of the Sarbanes-Oxley Act of 2002 requires enterprises to demonstrate and document the effectiveness of controls used to protect IT used to support financial reporting. Enterprises may seek to have their IT audited to conform with Sarbanes-Oxley.

SUMMARY

The present disclosure relates to a method for auditing an organization's internal controls for handling information technology configurations and vulnerabilities, including creating a technology summary summarizing relevant systems, determining the systems to test, identifying gaps in internal controls, reviewing and testing current controls, and generating comments based on the results of said reviewing and testing. The step of reviewing and testing current controls may further include, evaluating control standards for relevant systems, compiling organization's assertions regarding internal controls over vulnerability management process, obtaining organization's documentation concerning internal controls over vulnerability management process, documenting gaps in organization's internal controls over vulnerability management, communicating gaps to organization, testing relevant systems for vulnerability exposure, and concluding on organization's ability to achieve said organization's assertions regarding internal controls over vulnerability management process.

The present disclosure also relates to a method for evaluating internal controls governing the management of IT configurations and vulnerabilities, including defining internal control, organizing a project team to conduct an evaluation, documenting and evaluating internal controls at entry level, documenting and evaluating internal controls at the process, transaction and application levels, and evaluating overall effectiveness, identifying matters for improvement and establishing monitoring systems.

The present disclosure additionally relates to a system for auditing an organization's internal controls for handling information technology configurations and vulnerabilities, including an auditor for creating a technology summary summarizing relevant systems, an auditor for determining the systems to test, an auditor for identifying gaps in internal controls, an auditor for reviewing and testing current controls, and an auditor for generating comments based on the results of said reviewing and testing. The auditor for reviewing and testing current controls may also be an auditor for evaluating control standards for relevant systems, an auditor for compiling organization's assertions regarding internal controls over vulnerability management process, an auditor for obtaining organization's documentation concerning internal controls over vulnerability management process, an auditor for documenting gaps in organization's internal controls over vulnerability management, an auditor for communicating gaps to organization, an auditor for testing relevant systems for vulnerability exposure, and an auditor for concluding on organization's ability to achieve said organization's assertions regarding internal controls over vulnerability management process.

The present disclosure also relates to a system for evaluating internal controls governing the management of IT configurations and vulnerabilities, including an auditor for defining internal control, an auditor for organizing a project team to conduct an evaluation, an auditor for documenting and evaluating internal controls at entry level, an auditor for documenting and evaluating internal controls at the process, transaction and application levels, and an auditor for evaluating overall effectiveness, identifying matters for improvement and establishing monitoring systems.

The present disclosure additionally relates to a computer data signal embodied in a transmission medium and including computer executable instructions for auditing an organization's internal controls for handling information technology configurations and vulnerabilities, including creating a technology summary summarizing relevant systems, determining the systems to test, identifying gaps in internal controls, reviewing and testing current controls, and generating comments based on the results of said reviewing and testing. The step of reviewing and testing current controls may further include, evaluating control standards for relevant systems, compiling organization's assertions regarding internal controls over vulnerability management process, obtaining organization's documentation concerning internal controls over vulnerability management process, documenting gaps in organization's internal controls over vulnerability management, communicating gaps to organization, testing relevant systems for vulnerability exposure, and concluding on organization's ability to achieve said organization's assertions regarding internal controls over vulnerability management process.

The present disclosure also relates to a computer data signal embodied in a transmission medium and including computer executable instructions for evaluating internal controls governing the management of IT configurations and vulnerabilities, including defining internal control, organizing a project team to conduct an evaluation, documenting and evaluating internal controls at entry level, documenting and evaluating internal controls at the process, transaction and application levels, and evaluating overall effectiveness, identifying matters for improvement and establishing monitoring systems.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DRAWINGS

In describing the preferred embodiment of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Enterprises rely heavily on information technology (IT) to preserve the integrity of information, for example, sensitive financial information. The integrity of this information can be compromised in several ways. For example, hardware and software assets networked to the computers that store information should be properly configured. Improperly configured network assets can allow unauthorized people and programs to access the information thereby compromising the integrity of the information. Software assets employed by computers storing information, or computers networked to computers storing information are designed to prevent unauthorized access to information. However, due to the complexity of modern operating systems and software programs, the operating systems and computer programs themselves may allow unauthorized people to gain access to information by exploiting a vulnerability in the software's design. These vulnerabilities compromise the integrity of the information.

Configuration standards can be changed and vulnerabilities can be patched. Generally the vender of the software or operating system containing a vulnerability will release a patch after the vendor becomes aware of the vulnerability. A patch is a computer program that remedies a vulnerability in another computer program. However, while correct configuration standards and vulnerability patches exist, an enterprise should take steps to ensure these remedial measures are properly implemented. To ensure enterprises are taking appropriate steps to detect and resolve ineffective configuration standards and vulnerabilities, it is helpful to conduct an audit of the enterprise's IT. During the audit, auditors may review IT security measures to attempt to ascertain how configuration standards and vulnerabilities are dealt with to determine what, if any, additional measures should be adopted by the enterprise to help ensure that the security of information is properly maintained.

Figure 1:
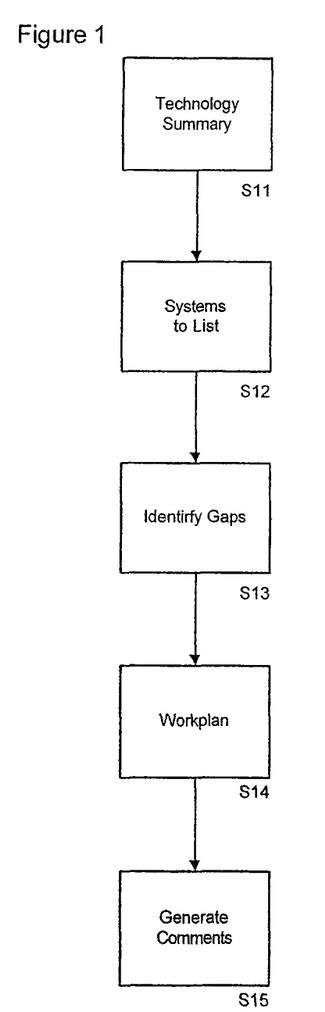
FIG. 1 shows a flow diagram showing the prior procedure for conducting IT audits.

FIG. 1 depicts a flow diagram showing a procedure for an IT security review during an exemplary audit. A technology summary may first be completed (Step S11). The technology summary may include lists of those IT systems that contain sensitive information such as financial information. The technology summary may be based on the internal documents of the enterprise. One or more auditors may then determine which IT systems are to be tested and produce a list of these systems (Step S12). Systems to be tested are those systems that could be used to gain access to sensitive information such as financial statement accounts. Gaps in the enterprise's internal controls are then identified (Step S13). Internal controls may include the procedures and tools used by the enterprise to identify and remedy vulnerabilities and improper configuration standards. Gaps may include areas where the enterprise's internal controls fall short of the internal controls that the enterprise should be implementing to maximize information security. The determination of what internal controls are ideal may be made by auditors who are trained and/or experienced in managing information security. Information regarding the enterprise's internal controls can be obtained in a number of ways, for example, by conferences between the auditors and the enterprise personnel. Identified gaps in the enterprise's internal controls can be used to determine where existing internal controls should be improved or new internal controls added. At times, not all information concerning the adequacy of the enterprise's internal controls can be gauged by conferring with the enterprise personnel. Accordingly, it may be beneficial to conduct IT security tests on the IT assets that appear on the list of systems to be tested. Accordingly, a work plan may be prepared for testing relevant IT systems (Step S14). A work plan is a detailed plain for testing the IT systems. IT systems may be tested by observing how the enterprise remedies vulnerabilities and configuration standards as they become known. IT systems may also be tested by attempting to exploit vulnerabilities and configuration standards that have been previously remedied by the enterprise. The work plan is then carried out and the IT systems are tested. The auditors engaged in the IT system testing may then generate comments based on the results of the tests (Step S15).

Figure 2:
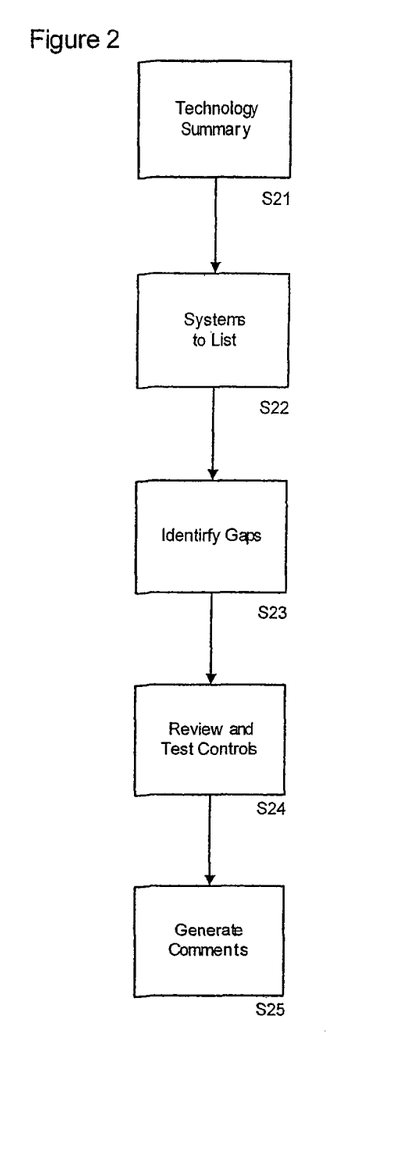
FIG. 2 shows a flow diagram showing the procedure for conducting IT audits according to an embodiment of the present disclosure.

FIG. 2 depicts a flow diagram showing the procedure for conducting IT audits according to an embodiment of the present disclosure. Steps S21, S22, S23 and S25 are identical to steps S11, S12, S13 and S15 from FIG. 1 respectively.

Computer systems running computer software tools can be used to assist in the auditing of IT systems. In the review and test Step S24, a review and test of the enterprise's internal controls are performed using computerized tools. Examples of such tools include Framework™ and Advisor™. These programs are used to manage vulnerability and configuration standard information. Framework™ is a computer server networked to the IT systems of the enterprise. For example, Framework™ helps manage IT security by accessing security information such as known configuration standards and software vulnerabilities. Framework™ can store and coordinate the use of IT security measures and can be used to run an automated content management system for remediation configuration standards and vulnerabilities. For more detailed information on Framework™, see co-pending application Ser. Nos. 10/264,789 and 10/264,879, which are hereby incorporated by reference. Advisor™ is an information system providing detailed information on known vulnerabilities and configuration standards. Advisor™ contains over 4,000 vulnerabilities published for over 1,000 applications, 170 devices, 110 operating systems and 10 databases. This system also contains implementation and review procedures for security configurations for at least 28 technologies, including servers, routers, firewalls and workstations, etc. By using Framework™ and Advisor™ an auditing firm is able to maintain a consistently high level of audit effectiveness across multiple audit teams.

Figure 3:
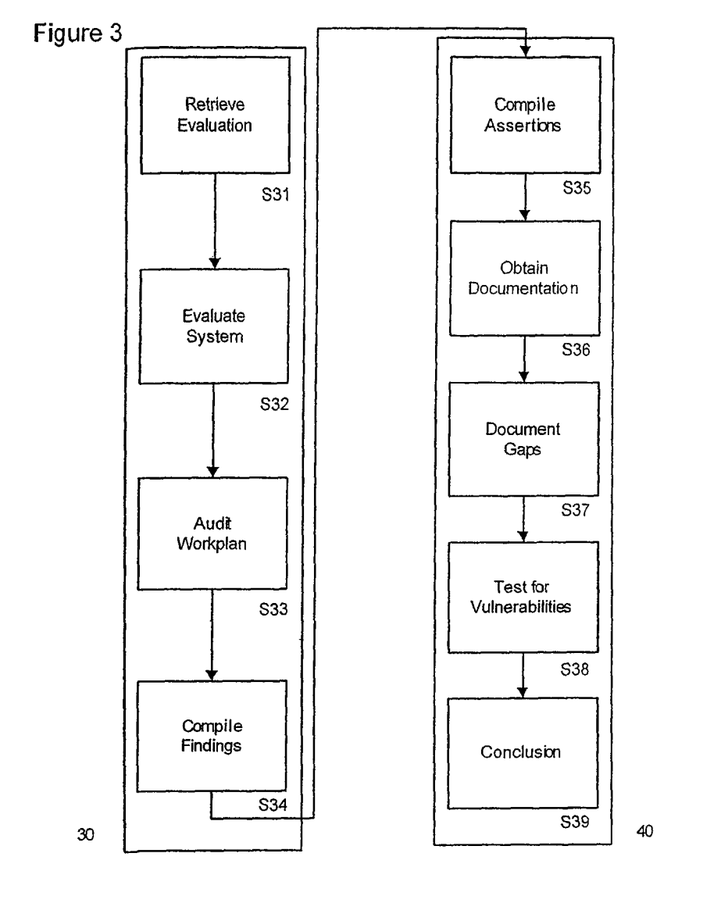
FIG. 3 shows a flow diagram detailing the procedure for reviewing and testing IT controls using tools such as Framework™ and Advisor™ according to an embodiment of the present disclosure.

FIG. 3 shows a flow diagram detailing Step S24 in FIG. 2 for further describing the procedure for reviewing and testing an enterprise's internal controls using computerized tools such as Framework™ and Advisor™ according to an embodiment of the present disclosure.

The procedure may include a configuration standards group of steps (30) as well as a vulnerabilities group of steps (40). In the configuration standards group of steps (30), review and testing of current IT configuration standards are performed. A program such as Advisor™, may be used to retrieve the correct IT configuration standards to be used for each IT system that can potentially be used to access sensitive information (Step S31). This may include logging in and accessing the program interface of a program such as Advisor™, defining which items of hardware or software incorporated into the IT systems of the enterprise (assets) are a high-risk for compromising the integrity of sensitive information, selecting configuration standard tasks to be reviewed and retrieving an audit work plan for the high-risk asset. The work plan may then be used to evaluate the system assets using manual review procedures that are generally used by the enterprise (Step S32). The auditor will enter his or her assessment of the assets and any other notes into a program such as Advisor™. An audit work plan report is generated and saved to a file (Step S33). This report may include configuration standard descriptions, control settings, risk assessments, procedures for manual review and assessment fields. Findings may then be compiled from the tests performed pursuant to the work plan and these findings may be integrated with audit findings (Step S34).

In the vulnerabilities group of steps (40), an IT vulnerability management process is performed and reviewed. The assertions of the enterprise's personnel regarding their internal controls over the IT vulnerability management process are first compiled (Step S35). The organization's documentation for internal controls over the vulnerability management process is obtained (Step S36). This information can be gathered, for example, by inquiring with the enterprise's personnel and/or though the enterprise's internal memoranda. Any observed gaps in the enterprise's IT vulnerability management internal controls are documented and communicated to the enterprise (Step S37). IT vulnerability may then be tested by identifying the systems and critical applications relevant to the financial systems using a technology summary (Step S38). A technology summary is a list of all the IT system assets used by the enterprise to handle sensitive information. A risk rating range of the vulnerabilities to review may be determined based on the auditor's risk evaluation for each system. Each technology may include, for example, over 100 vulnerability exposures. The audit team selects the subset of the assets to be reviewed and determines which assets reflect the greatest risk to the integrity of sensitive information. This may be accomplished by assigning an applicable vulnerability risk value to each asset. A determination can be made as to what risk values are considered sufficient to warrant testing. The assets that fall outside of the risk rating range under consideration will not be tested. The systems with risk ratings matching or exceeding the determined sufficient risk rating may then be tested for vulnerability exposure. Advisor™ or other assessment tools may be used to bring up a list of vulnerabilities known to affect the particular asset under investigation. Advisor™ or another assessment tool then provides the necessary information and programs to implement any patches or workaround procedures. The workaround procedures may remedy software vulnerabilities where no patch exists by setting up the asset to not use the vulnerable software code rather than fixing the vulnerability directly. When using Advisor™, assessing a system for patches is done using Advisor™ Inventory Service. Advisor™ supports at least six major operating systems. If the audited system is using an operating system that is not supported, other assessment tools may be used. The results of the testing may be documented noting the high-risk vulnerabilities for review by the enterprise management. A file can also be created with all vulnerability details, including names, technical recommendations, risk rating, risk assessments and vulnerability cross reference fields. For example, cross reference fields may indicate when a single patch corrects multiple vulnerabilities. This information may be useful, for example, when checking for a vulnerability that may have already been patched when a different vulnerability was patched. The test findings may be summarized for vulnerability management accuracy. Auditors may then form a conclusion regarding enterprise management's ability to detect and manage vulnerabilities relating to their IT system assets (Step S39).

Figure 4:
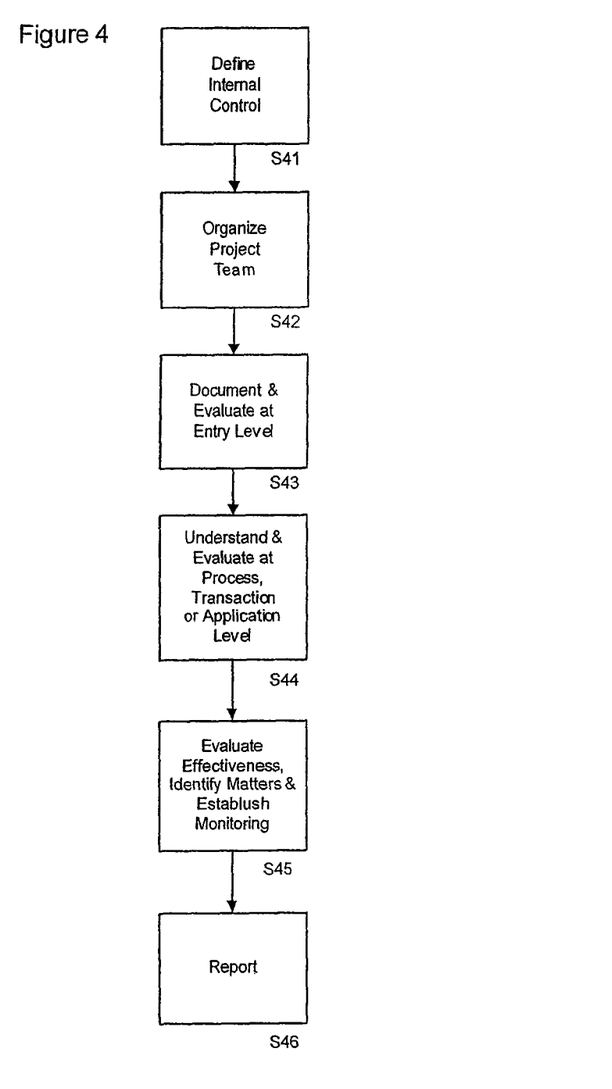
FIG. 4 shows a high-level view of the method for evaluating vulnerability management internal controls.

FIG. 4 shows a high-level view of a method for forming a conclusion regarding the client's ability to detect and manage vulnerabilities relating to the internal control of IT system assets. Initially, a definition of internal control is determined (Step S41). For example, the auditing team can discuss, with the appropriate enterprise personnel, the enterprise's understanding of the effect IT vulnerabilities can have on the integrity and completeness of its financial information. The audit team may at this time educate enterprise's personnel about the importance of vulnerability management control. A project team may be organized to conduct an evaluation of IT system assets (Step S42). In this step, the scope of the project can be defined. The enterprise may form a project team composed of enterprise personnel who are familiar with the enterprise's current vulnerability management control process. Auditors may provide a project team observer who is familiar with the best practices for managing IT vulnerabilities. The roles of the project team members may be clearly defined, and may include the identifying the enterprise personnel with the overall responsibility for the success of the project and/or assigning the enterprise personnel to discrete aspects of the project. A project timeline may also be established. A preliminary assessment of the organizational risk posed by the enterprise's IT vulnerability management control process can also be formed. A network security architecture analysis may be produced. This may include an analysis to evaluate the risks associated with IT vulnerabilities. Internal controls can be documented and evaluated for immediately responding to vulnerabilities (Step S43). Policies and procedures may be developed to address the general concept of managing IT vulnerabilities in the systems and applications that support the creation and storage of sensitive information such as financial information. Any identified weakness in the controls and processes may be included in a preliminary gap analysis. This step may include one or more of the following features: a documented process for identifying all applicable IT vulnerabilities within an acceptable period of time, a document vulnerability risk rating process, a documented process for consistently identifying affected systems and deploying vulnerability information to the appropriate enterprise personnel, a document process for evaluating and remedying vulnerabilities based on risks and potential impact on the integrity of financial data and a process for documenting why certain vulnerabilities are not remedied and the existence of other mitigating internal controls that help manage IT vulnerabilities. Internal controls are then documented and evaluated for managing IT vulnerabilities relating to IT system processes, transactions and/or applications (Step S44). In this step, enterprise personnel can identify the IT systems that handle key financial statement accounts, transactions and applications. These systems may also be documented and highlighted on a map of the client's IT network. The network security architecture controls and access controls that govern access to these systems and applications may be identified and documented. Weaknesses in the client's internal controls governing access, particularly vulnerability management internal controls, can also be documented in the gap analysis. The duties of the enterprise's personnel involved in applying the internal controls that manage IT vulnerabilities can be reviewed to measure the degree of segregation of duties. This may include making sure one person does not perform multiple responsibilities that are in conflict with one another. For example, this may include making sure the people who are responsible for remediation are not also the people responsible for checking to see if remediation was effective. Weaknesses resulting from conflict in duties may be included in the gap analysis. The auditor can use the enterprise's internal control documentation to walk through a known IT vulnerability to assess the client's procedures for identifying the vulnerability, assessing the risk and remediation. The auditor may document a gap analysis based on the assessment of the client's internal control documentation and the walk-through. The auditor can also document and discuss mitigating internal controls prior to documenting the gap analysis. The auditor also documents suggestions for future revision of IT vulnerability management internal control process. The auditor may then evaluate overall effectiveness, identify areas for improvement, establish a monitoring system and reach conclusions on management's assertions on internal controls (Step S45). The auditor may also design testing procedures to test the enterprise's IT vulnerability management control process based on the results from Step S44. The auditor can assess the client's internal control process for completeness. For example, the auditor may use Advisor™ for this purpose. The auditor may document any weaknesses found and include recommendations for improvement. The auditor can also document a conclusion regarding enterprise management's ability to achieve the level of IT vulnerability management that the enterprise seeks to provide. A monitoring system may be established to ensure that IT vulnerability management internal controls continue to address the ongoing discovery of IT vulnerabilities.

Figure 5:
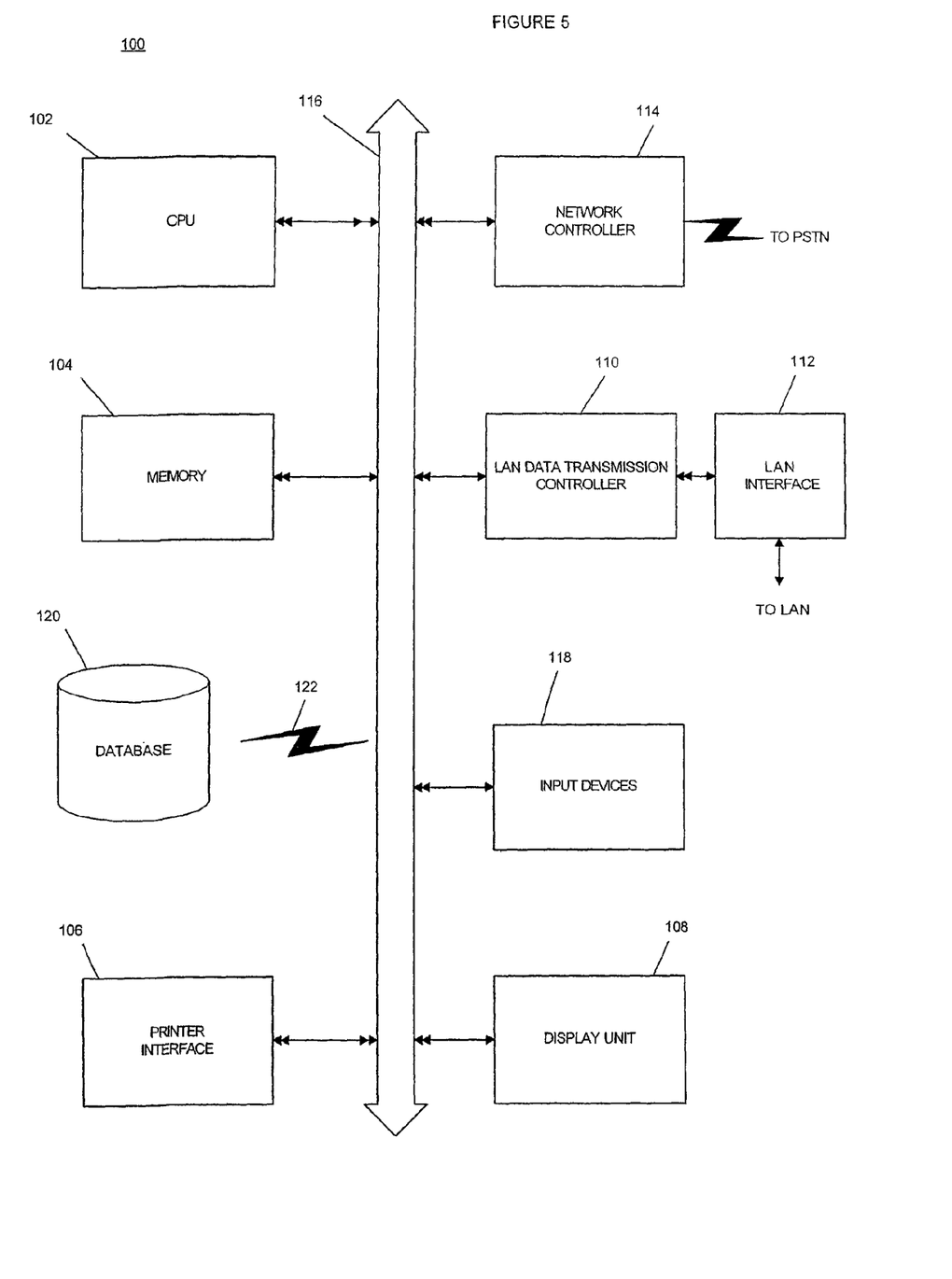
FIG. 5 illustrates an example of a computer system capable of implementing the method and apparatus of the present disclosure.

FIG. 5 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 100 may include a central processing unit (CPU) 102, for example, Random Access Memory (RAM), a printer interface 106, a display unit 108, a local area network (LAN) data transmission controller 110, a LAN interface 112, a network controller 114, an internal buss 116, and one or more input devices 118, for example, a keyboard, mouse etc. As shown, the system 100 may be connected to a data storage device, for example, a hard disk, 120 via a link 122.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for auditing an organization's internal controls for handling information technology (IT) configurations and vulnerabilities comprising:
    receiving, with a processor, a technology summary summarizing a plurality of IT systems in an organization;
    based on the technology summary, assigning, with the processor, a vulnerability risk value to each of the plurality of IT systems, wherein each vulnerability risk value represents the risk of the associated IT system compromising the integrity of sensitive information in the organization;
    determining, with the processor, a risk threshold;
    comparing the risk threshold to the vulnerability risk value associated with each of the plurality of IT systems;
    based at least in part on the comparison between the risk threshold and the vulnerability risk value associated with each of the plurality of IT systems, selecting, with the processor, one or more of the plurality of IT systems to test;
    for each of the selected one or more IT systems, identifying a first vulnerability and a second vulnerability that affect the respective IT system;
    performing, with the processor, a test of each of the selected one or more IT systems, based on the first vulnerability and the second vulnerability that affect the respective IT system;
    accessing a file associated with the first vulnerability, the file identifying a patch that can correct the first vulnerability and/or the second vulnerability in the respective IT system;
    implementing the patch and determining whether the first vulnerability has been corrected using the patch identified in the file; and
    if the first vulnerability has been corrected, determining, based on the file, whether the second vulnerability was corrected when the first vulnerability was corrected.

2. The method of claim 1, wherein performing a test comprises:
    evaluating control standards for each of the one or more IT systems identified in the IT systems list;
    receiving information associated with the organization's internal controls over a vulnerability management process;
    determining one or more gaps in the organization's internal controls over the vulnerability management process;
    generating a report, the report including the one or more determined gaps; and
    testing one or more of the IT systems identified in the IT systems list for vulnerability exposure.

3. The method of claim 1, further comprising:
- identifying software code associated with the first vulnerability that affects the respective IT system; and
- configuring the respective IT system to not use the identified software code.

4. A system for auditing an organization's internal controls for handling information technology (IT) configurations and vulnerabilities comprising:
- a processor; and
- a program storage device readable by the computer system, embodying a program of instructions executable by the processor, the program of instructions comprising:
  - a receiving unit for receiving a technology summary summarizing IT systems in an organization;
  - an assigning unit for assigning, based on the technology summary, a risk value to each of the IT systems, wherein each vulnerability risk value represents the risk of the IT system compromising the integrity of sensitive information in the organization;
  - a determining unit for determining a risk threshold;
  - a comparing unit for comparing the risk threshold to the vulnerability risk value associated with each of the plurality of IT systems;
  - a selecting unit for selecting one or more of the plurality of IT systems to test based at least in part on the comparison between the risk threshold and the vulnerability risk value associated with each of the plurality of IT systems;
  - an identifying unit for identifying, for each of the selected one or more IT systems, a first vulnerability and a second vulnerability that affect the respective IT system
  - a performing unit for performing, with the processor, a test of each of the selected one or more IT systems, based on the first vulnerability and the second vulnerability that affect the respective IT system;
  - an accessing unit for accessing a file associated with the first vulnerability, the file identifying a patch that can correct the first vulnerability and/or the second vulnerability in the respective IT system;
  - a determining unit for implementing the patch and determining whether the first vulnerability has been corrected using the patch identified in the file; and
  - a determining unit for determining, based on the file, if the first vulnerability has been corrected, whether the second vulnerability was corrected when the first vulnerability was corrected.

5. The system of claim 4, wherein the performing unit is operable to perform the test by:
- evaluating control standards for each of the one or more IT systems identified in the IT systems list;
- receiving information associated with the organization's internal controls over a vulnerability management process;
- determining one or more gaps in the organization's internal controls over the vulnerability management process;
- generating a report, the report including the one or more determined gaps; and
- testing one or more of the IT systems identified in the IT systems list for vulnerability exposure.

6. A computer system comprising:
- a processor; and
- a program storage device readable by the computer system, embodying a program of instructions executable by the processor to perform method steps for auditing an organization's internal controls for handling information technology configurations and vulnerabilities comprising:
  - receiving, a technology summary summarizing IT systems in an organization;
  - based on the technology summary, assigning a vulnerability risk value to each of the IT systems, wherein each vulnerability risk value represents the risk of the IT system compromising the integrity of sensitive information in the organization;
  - determining a risk threshold;
  - comparing the risk threshold to the vulnerability risk value associated with each of the plurality of high-risk IT systems;
  - based at least in part on the comparison between the risk threshold and the vulnerability risk value associated with each of the plurality of high-risk IT systems, selecting one or more of the plurality of IT systems to test;
  - for each of the selected one or more IT systems, identifying a first vulnerability and a second vulnerability that affect the respective IT system;
  - performing, with the processor, a test of each of the selected one or more IT systems, based on the first vulnerability and the second vulnerability that affect the respective IT system;
  - accessing a file associated with the first vulnerability, the file identifying a patch that can correct the first vulnerability and/or the second vulnerability in the respective IT system;
  - implementing the patch and determining whether the first vulnerability has been corrected using the patch identified in the file; and
  - if the first vulnerability has been corrected, determining, based on the file, whether the second vulnerability was corrected when the first vulnerability was corrected.

7. The computer system of claim 6, wherein performing a test comprises:
- evaluating control standards for each of the one or more IT systems identified in the IT systems list;
- receiving information associated with the organization's internal controls over a vulnerability management process;
- determining one or more gaps in the organization's internal controls over the vulnerability management process;
- generating a report, the report including the one or more determined gaps; and
- testing one or more of the IT systems identified in the IT systems list for vulnerability exposure.

* * * * *